Nov. 19, 1968  F. A. SATTLER  3,412,354
ADHESIVE COATED ELECTRICAL CONDUCTORS
Original Filed Feb. 18, 1963

WITNESSES
Robert C. Baird
James F. Young

INVENTOR
Frank A. Sattler.
BY Alex Mich, Jr.
ATTORNEY

United States Patent Office 3,412,354
Patented Nov. 19, 1968

3,412,354
ADHESIVE COATED ELECTRICAL CONDUCTORS
Frank A. Sattler, Monroeville, Pa., assignor to Westinghouse Electric Corporation, Pittsburgh, Pa., a corporation of Pennsylvania
Original application Feb. 18, 1963, Ser. No. 259,260. Divided and this application Feb. 8, 1967, Ser. No. 614,664
20 Claims. (Cl. 336—205)

ABSTRACT OF THE DISCLOSURE

Insulated magnet wire and other electrical conductors are coated with amine-modified epoxy resin compositions in conventional wire enameling towers. The coatings are fusible and may be heated to fusion in order to bond the conductors into a unitary coil. The coatings may be treated with catalysts such as boron trifluoride, polyisocyanates and blocked polyisocyanates, before fusion, so that the coating is converted to an infusible solid state. The infusible bond has a better high temperature bond strength than the fusible bond. The amine-modified epoxy resin compositions may also be blended with polyvinyl acetal, aliphatic polyepoxide and phenol-modified coumarone-indene resins. The blends may also be applied in conventional towers and may be converted to an infusible thermoset state with catalysts.

Cross references to related applications

This application is a division of abandoned application Ser. No. 259,260, filed on Feb. 18, 1963.

Background of the invention

This invention relates to adhesive coated electrical conductors, bonded coils and methods for producing bonded coils. More specifically, this invention relates to fusible adhesive coated electrical conductors in which the coatings are amine-modified epoxy resin compositions and blends thereof and to conductors bonded together by the adhesive coating.

To withstand the rigors of typical environments for prolonged periods, electrical coils have been bonded into a unitary mass by impregnating wound coils with a varnish and thereafter curing the varnish. Resin coated magnet wire is ordinarily employed, the resinous coating providing the turn insulation. In some instances, the resinous coating may alone be relied on to provide the layer insulation, although other materials as for example, paper may be provided to increase the layer-to-layer dielectric strength.

Varnish impregnation provides coils which are self-supporting and free from the problems associated with relative movement of turns and layers. The impregnation, frequently carried out under vacuum, requires an extensive investment in and maintenance of equipment as well as extended handling of coils in processing. Poor varnish penetration and solvent entrapment are frequently encountered problems, especially in the impregnation of thick or tightly-packed coils.

In an effort to overcome the cost and disadvantages of varnish impregnation, adhesive coated wires have been employed in the preparation of electrical coils. Generally, the wires consist of a fusible thermoplastic material coated over a wire insulated with a coating of an infusible thermosetting resinous composition. The thermoplastic overcoating, as for example, polyvinyl butyral, can be solvent treated immediately before winding to soften and render the coating adhesive. As the coil is wound, the individual turns are bonded together, thus providing a self-supporting unitary coil. Alternatively, the coil may be heated after winding to fuse the thermoplastic coating, firmly bonding the turns together upon cooling.

It is apparent that the use of adhesive coated wires eliminates any of the problems and disadvantages of varnish impregnation. However, the thermoplastic materials employed heretofore have had low strength at elevated temperatures, poor solvent resistance and poor thermal stability. Thus, in the past, coils prepared from thermoplastic adhesive coated wires have been limited to low temperature applications and other generally mild environmental conditions.

Summary

Certain resinous compositions comprising amine-cured epoxy resins have been found to provide particular advantages as adhesive coatings on electrical conductors. The coatings may be applied with conventional wire coating equipment. The coatings are fusible so that conductors may be fusion bonded by heating. Yet, by using certain catalysts prior to fusion, the same heating step will convert the adhesive to an infusible thermoset state so that the bonds will have high strength at elevated temperatures. The fusible adhesive coating is tough and flexible so the electrical conductors may be wound into coils. Wound coils, with conductors bound into a unitary mass, may be produced in processes that do not require a separate, otherwise necessary, varnish impregnation and cure.

It is an object of this invention to provide adhesive coated electrical conductors which may be conveniently made by means of conventional wire coating processes and equipment.

It is an object of this invention to provide flexible adhesive coated wires and conductors which are capable of being fused together into a rigid mass with a resultant high bond-strength at elevated temperatures, good chemical resistance and thermal stability.

Another object of this invention is to provide tack-free flexible adhesive coated electrical conductors which may be transformed into a thermoset rigid infusible coil mass.

Yet another object of this invention is to provide a process for making rigid, self-supporting electrical coils from flexible adhesive coated wires, the coils being fused and/or cured into a unitary mass having excellent bond strength at elevated temperatures.

Further objects and advantages of the invention will become apparent as the following description proceeds and features of novelty which characterize the invention will be pointed out in particularity in the claims annexed to and forming a part of this specification.

Brief description of the drawing

For a better understanding of the invention reference may be had to the accompanying drawings, in which.

Description of the preferred embodiments

Figure 1:
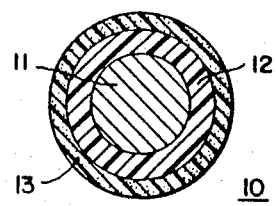
FIGURE 1 is a cross-sectional view illustrating a conductor coated according to this invention.

It has now been discovered that certain resinous compositions comprising amine-cured aromatic base diglycidyl ethers or epoxy resins and modified blends thereof are suitable for adhesive wire coatings. These compositions may be applied to wires in conventional wire coating equipment. The coating may be cured so that it is tack-free at room temperature and may be handled and spooled as conventional magnet wire. The compositions are exceptionally suitable for adhesive coatings since they are tough and flexible after curing at regular wire enamel tower curing conditions and yet fusible at 125 to 175° C.

Since the fusible wire coating is tough and flexible, automatic winding machines may be employed to wind this wire into coils. Wound coils may be heated to a point where fusion of the adhesive coating occurs, with good wire-to-wire adhesion. Thus, wound coils which are self-supporting and bound into a unitary mass may be easily produced. Tests indicate that the wire-to-wire adhesion of fused coated wires has a good bond strength, even at elevated temperatures. Bonded coils exhibit good chemical resistance and thermal stability.

Compositions suitable for adhesive coating of electrical conductors according to this invention comprise the reaction product of an aromatic base diglycidyl ether having an epoxide equivalent of about 950 to 3200 with an aromatic diamine in the range of about 0.25 to 1.0 mol of diamine per epoxy equivalent. The foregoing reaction product may be blended with up to 55%, by weight, on a solids basis, of polyvinyl acetal resin; up to 19%, by weight, of an aliphatic base glycidyl polyether having an epoxy equivalent of about 195 to 300; and up to 45%, by weight, of a phenol-modified coumarone-indene resin. The adhesive coating formulations may, for some applications, be employed as the only coating on an electrical conductor. However, superior electrical properties attend the combination coatings of this invention.

Well known wire enamel insulating coatings may be employed as the first coating or undercoating on the electrical conductor. The adhesive coatings, described hereinabove, are then employed as the second coating or overcoating. Not only are the adhesive overcoatings compatible with the undercoating, but adhesive formulations falling within the above description can be coated in the same towers employed to coat conductors with epoxy, polyester, polyurethane and other known wire enamels. The advantages of applying both the undercoating and the overcoating in a continuous process in the same tower will be obvious to those skilled in the art.

The resinous aromatic base epoxy compositions which are employable in this invention may be prepared, in accordance with one preferred procedure, by reacting predetermined amounts of at least one polyhydric phenol or polyhydric alcohol and at least one epihalohydrin in an alkaline medium. Phenols, suitable for use in preparing such resinous polymeric epoxides, include those which contain at least two phenolic hydroxyl groups per molecule. Polynuclear phenols which have been found to be particularly suitable include those wherein the phenol nuclei are joined by carbon bridges, such for example as 4,4′ - dihydroxy - diphenyl - dimethyl-methane (referred to hereinafter as bisphenol) "A"), and 4,4 - dihydroxy-diphenyl-methane.

While it is preferred to use epichlorohydrin as the epihalohydrin in the preparation of the resinous polymeric epoxide of the present invention, homologs thereof, for example, epibromohydrin and the like also may be used advantageously.

In the preparation of the resinous aromatic base polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

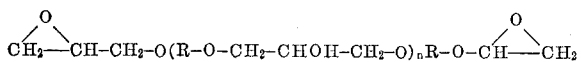

wherein $n$ is an integer of the series 0, 1, 2, 3 . . . and R represents the divalent aromatic hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol has an average number of epoxide groups greater than 1.0 in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the average number of epoxide groups in the average molecule of the product is not necessarily the integer 2.0. However, in all cases, it is a value greater than 1.0. It is thus a value between 1.0 and 2.0. The epoxide or epoxy equivalent is determined by dividing the average molecular weight by the average number of epoxide groups in the average molecule.

The number of epoxide groups in the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to the chlorohydrin groups. After cooling, the excess pyridinium chloride is back-titrated with 0.1 N sodium hydroxide in methanol to the phenolphthalein end point.

For the purposes of this invention, aromatic base glycidyl polyethers or epoxy resins having an epoxy equivalent of about 950 to 3200 are employed in the reaction with aromatic diamines, to prepare the adhesive coating resin.

To prepare the adhesive coating composition, the heretofore described aromatic base diglycidyl ether or epoxy resin is reacted with an aromatic primary diamine in a range of proportions from about 0.25 to 1.0 mol of diamine per epoxy equivalent. The aromatic diamine acts as a chain growth promoter, thus providing a linear heteropolymerized resin. The aromatic diamines contain sites or radicals which are reactive with the epoxy groups in the epoxy resin. They become a vital part of the cured resin chain. Suitable aromatic primary diamines include, for example, metaphenylene diamine, paraphenylene diamine, diamine pyridine, 4,4′-methylene dianiline and metaxylene diamines.

Compositions resulting from the reaction of the aromatic base diglycidyl ether and aromatic diamine in the range of 0.25 to 1.0 mol of diamine per equivalent of epoxy produce adhesive coatings with satisfactory flexibility. Ratios in excess of 1.0 mol of diamine per epoxy equivalent result in unreacted diamine. The excess diamine is volatilized off during the baking process and satisfactory coatings may be so produced. A ratio of about 1 mol of diamine per epoxy equivalent is preferred for tank stability. Ratios below 0.25 mol of diamine per epoxy equivalent produce coatings with unsatisfactory flexibility.

Theoretically, each hydrogen atom on the amino group is reactive. Thermoplasticity should be attainable only in ratios of more than 0.5 mol of diamine per epoxy equivalent. However, as discussed hereinabove, compositions produced from ratios of less than 0.5 mol of diamine per epoxy equivalent are satisfactory and the coatings produced therefrom have cemented properly. It should be noted that where an aliphatic base epoxy diluent is blended with the amine modified aromatic epoxy product, the ratio of diamine per epoxy equivalent is calculated on the basis of the aromatic base epoxy alone. Additional amine is not required for the aliphatic epoxy flexibilizer. It has also been found that up to 50% of the aromatic diamines may be replaced by at least one alkyl amino alcohol, for example, monoethanolamine, α-aminoisopropyl alcohol, 2-aminobutanol-1, and 2-amino-2-methylpropanol-1 on an equimolar basis.

As noted briefly hereinabove, the described heteropolymerized resin, or amine modified epoxy, may be blended with up to 55% by weight on a solids basis, of a polyvinyl acetal resin. The preparation of these resins is well known in the art and not detailed herein. Polyvinyl acetal resins may be represented by the following structure:

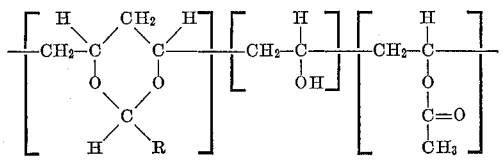

The proportions of polyvinyl acetal, polyvinyl alcohol and polyvinyl acetate are controlled and randomly distributed along the molecule. The polyvinyl acetals are prepared from aldehydes and polyvinyl alcohol. It will be apparent to those skilled in the art that R in the formula above is determined by the particular aldehyde employed in the reaction. While materials prepared from either formaldehyde, acetaldehyde, propionaldehyde or butyraldehyde may be employed, it is preferable in this invention to employ a polyvinyl formal, having an acetate content of at least 20%, expressed as the weight percentage of polyvinyl acetate. The adhesive coating so prepared will have a fusion temperature of about 125–175° C. Lower acetate contents will raise the fusion temperature and may be employed where heating equipment of apparatus design does not limit the temperature of fusion.

Aliphatic base glycidyl polyethers or epoxy resins having an epoxy equivalent of about 195 to 300 are suitable diluents for blending with the described adhesive coating in amounts up to 19%, by weight, on a solids basis. Among satisfactory reactive aliphatic base epoxy diluents are butyl glycidyl ether, allyl glycidyl ether and the like. Their preparation is known in the art and details are not given herein.

Up to 45%, by weight, of a phenol-modified coumarone-indene resin may be blended with the heteropolymerized resin described, to prepare yet another satisfactory adhesive coating composition. Various known procedures are available for the production of phenol-modified coumarone-indene resins. Reference is made to German Patent No. 302,543 and U.S. Patent 2,077,099, for example, for a specific description of methods which may be employed.

Adhesive coating compositions, according to this invention, contain the described heteropolymerized resin and blends thereof diluted to satisfactory coating viscosity with suitable solvents comprising one or more liquids such as cresylic acid, xylene and the like.

As noted briefly hereinabove, the adhesive coating of this invention maintains a good bond strength at elevated temperatures after fusion. It has also been discovered that the bond strength of the adhesive coating, particularly at elevated temperatures, can be improved by dipping the adhesive coated wire in an alcohol-toluol solution of a complexed boron trifluoride catalyst before fusion. Boron trifluoride etherate and boron trifluoride monoethylamine, known boron trifluoride complexes, are examples of suitable materials. Alcohol-toluol solutions containing from about 5% to 10%, by weight, of a boron trifluoride complex are suitable dipping fluids.

When the boron trifluoride dip is employed, the adhesive coating composition is heated not only to fuse the coating so that the individual conductors are bonded together, but also to cure the coating to a solid infusible thermoset state. It will be apparent, therefore, that the adhesive coating composition per se is a thermoplastic material but when treated with the boron trifluoride complexes and heated, it is thermoset.

The adhesive coating composition and the adhesive coating layer have the advantage of being readily responsive or adjustable to the performance requirements of the wound coil. Where the ultimate high temperature bond strength is required, the boron trifluoride treatment produces a rigid infusible coil mass. Where the self-healing properties of a thermoplastic coating are more valuable, the boron trifluoride treatment may be omitted.

It has also been discovered that the described adhesive coating compositions may be rendered thermosetting and cured to an infusible state by dipping a coated wire in a solution of a polyisocyanate or blocked polyisocyanate. Polyisocyanates, having the general formula:

$$R-(N=C=O)_n$$

wherein R is a polyvalent organic radical and $n$ is an integer of 3 or more, may be employed. Examples of suitable isocyanates include tolylene triisocyanate, benzenetriisocyanate, ethylene tetraisocyanate and diphenyl triisocyanate. As is apparent from the foregoing formula, any isocyanate containing three or more isocyanate groups in the molecule may be employed.

Blocked polyisocyanates, having the general formula:

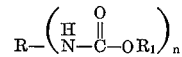

wherein R is a polyvalent organic radical, $n$ is an integer of 3 or more and $R_1$ is a phenyl group or a derivate thereof containing methyl substituents, may also be employed to cure the amine modified epoxy to its infusible state. The blocked polyisocyanates may be prepared by methods known in the art, for example by reacting polyhydric compounds having at least 3 hydroxyl groups with diisocyanates in ratios wherein the diisocyanate and hydroxyl groups are equal. Compounds containing 3 or more isocyanate groups may be reacted with phenol derivatives. Examples of materials available by proprietary names include those of Mobay Chemical Company known as Mondur SH, having the formula:

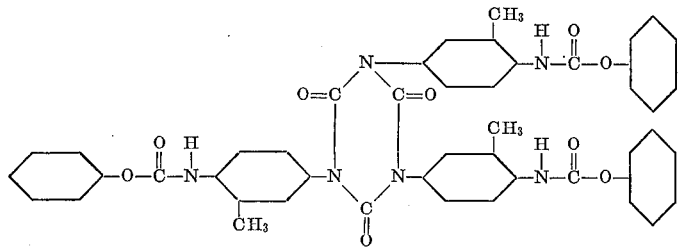

and Mondur S, having the formula:

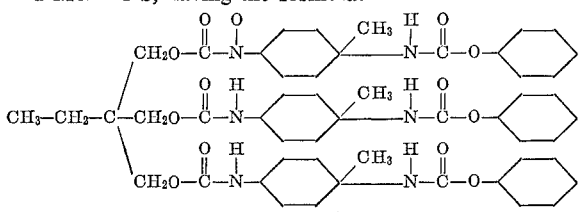

It will be apparent to those skilled in the art, that partially blocked polyisocyanates may also be employed. Moreover, it is apparent that solutions of the described boron trifluorides and polyisocyanates have low viscosities and will easily penetrate the interstices of a wound coil and act as a cross-linking agent for the cement coated wire.

The composite wire coatings, in the following specific examples, had an undercoating of a known urea-formaldehyde modified epoxy resin wire enamel. The liquid coating compositions, employed to produce the undercoat, were prepared by reacting 65%, by weight on a solids basis, of a glycidyl polyether with 35%, by weight, or a urea-formaldehyde resin. The resulting resin was diluted to a suitable coating viscosity by means of a "Cellosolve" acetate-cresylic acid-xylene solvent. "Cellosolve" is a proprietary designation for ethylene glycol monoethyl ether. The preparation of urea-formaldehyde modified epoxy resin wire enamels is well known in the art and need not be detailed herein. Reference may be made to U.S. Patent 2,991,326, assigned to the assignee of this invention, for details. It is to be understood that although a composite wire coating having the urea-formaldehyde modified epoxy resin undercoat is preferred, composites with other known wire enamels as undercoats are satisfactory and within the intended scope of this invention.

A variety of adhesive overcoating compositions were prepared as described more fully in the examples below. Employing a two coat system with four dips in the undercoating composition followed by two dips in each particular adhesive overcoating composition, 17 AWG copper wire was prepared with a 2.0 mil build of the undercoat and a 1.0 mil build of the overcoat. A conventional fifteen foot enameling tower, maintained at a temperature of 430° C., was employed in each of the following examples. It should be noted that the use of conventional equipment for the application of the adhesive coating is a distinct advantage of this invention.

Adhesive or bond strength tests were conducted on each composite-coated wire prepared in the examples below. Test samples were prepared by tightly wrapping the sample composite-coated wire around itself into a helical coil of four turns. The samples, so prepared, were fused at given temperatures for one hour. The force required to pull the straight piece of wire out of the helical coil was measured. In some instances, bond strengths were measured at elevated temperatures as well as at room temperature. Some samples were dipped into solutions containing a boron trifluoride coordinated complex or a polyisocyanate before fusion or cure, the breaking force being measured at room and elevated temperatures to illustrate the effect of this treatment on bond strengths. The term "Aromatic Base Epoxy Resin," in the following examples means the heretofore described reaction products of epihalohydrin and polyhydric phenols, a particularly suitable polyhydric phenol being bisphenol A. It should be apparent that the term diglycidyl ether of a polyhydric phenol is descriptive of such epoxy resins.

EXAMPLE I

|  | Grams | Mols Diamine per Epoxy Equivalent |
|---|---|---|
| Aromatic Base Epoxy Resin (Epoxy equivalent= 3200) | 600 | 0.89 |
| M-phenylenediamine | 18 | |

The epoxy resin was dissolved in 900 grams of "Cellosolve" acetate in a 3-neck flask containing a stirrer, thermometer, nitrogen gas inlet tube and reflux condenser. The diamine was added and the solution refluxed for two hours at 140° C. with nitrogen sparging. The solution was diluted to coating viscosity with 200 grams of cresylic acid and 600 grams of xylene and employed as an adhesive coating over the urea-formaldehyde modified epoxy undercoating.

A coating speed of 36 feet per minute was maintained. A combination coating having an undercoat build of 2.0 mils and an adhesive overcoat build of 1.0 mil was produced. The dual coated wire was tack-free at room temperature. The coating exhibited good flexibility, abrasion resistance and dielectric strength. After fusing the adhesion test samples for one hour at 150° C., 30 pounds of force were required to remove the straight piece of wire from the helical coil at room temperature.

EXAMPLE II

|  | Grams | Mols Diamine per Epoxy Equivalent |
|---|---|---|
| Aromatic Base Epoxy Resin (Epoxy Equiv.= 3200) | 600 | 1.78 |
| M-phenylenediamine | 36 | |

A procedure similar to that described in Example I was employed except that a greater amount of diamine was used to prepare the adhesive composition. After fusing test samples of this wire for one hour at 150° C., 52 pounds of force were required to remove the straight piece of wire from the helical coil at room temperature.

EXAMPLE III

| Modified Epoxy Component | Grams | Mols Diamine per Epoxy Equivalent |
|---|---|---|
| Aromatic Base Epoxy Resin (Epoxy Equiv.= 3200) | 600 | 0.89 |
| M-phenylenediamine | 18 | |

A procedure identical to that described in Example I was followed herein. As detailed hereinbelow, this product was one component of a blended adhesive composition.

Polyvinyl formal component:
  Polyvinyl formal resin (polyvinyl acetate=40–50%) _____grams__ 300
  M,p-cresol _____do____ 850
  Solvesso 100 _____do____ 850

The polyvinyl formal resin was dissolved in the m,p-cresol and Solvesso 100. This solution was employed in the blended adhesive composition described below.

Blended adhesive composition (solids basis):
  Percent by weight
  Modified epoxy component_____ 65
  Polyvinyl formal component _____ 35

In conjunction with the urea-formaldehyde modified epoxy undercoating composition described heretofore, the blended adhesive composition was coated on No. 17 AWG wire to produce an undercoat build of 2.0 mils and an adhesive overcoat build of 1.0 mil. The wire coating had good flexibility, abrasion resistance, and dielectric strength. These properties were obtainable with a wide latitude of baking conditions, these results being attained with speeds of 28 to 36 feet per minute with the enameling tower maintained at 430° C. After fusing adhesion test samples for one hour at 150° C., 40 pounds of force were required to remove the straight piece of wire from the helical coil at room temperature.

EXAMPLE IV

Blended adhesive composition (solids basis):

|  | Percent by weight |
|---|---|
| Modified epoxy component | 45 |
| Polyvinyl formal component | 55 |

The modified epoxy component and the polyvinyl formal component employed herein were identical to those in Example III. The proportions of the components blended in this example was as noted above. A dual coating was applied to 17 AWG wire as in Example III. After fusing adhesion test samples for one hour at 150° C., 68 pounds of force were required to remove the straight piece of wire from the helical coil at room temperature. Similar helical coils with this adhesive coating composition were also tested at elevated temperatures and the following values were obtained: 19 pounds at 125° C., 6 pounds at 135° C. and 3 pounds at 150° C.

Another group of helical coils coated, as described, were dipped for five minutes in a solvent of equal parts, by volume, of alcohol and toluol solution containing 7.5%, by weight, of the monoethylamine complex of boron trifluoride. The samples were then fused for one hour at 150° C. and the following results were obtained in the adhesion tests: 95 pounds at room temperature, 39 pounds at 125° C., 32 pounds at 140° C. and 7.7 pounds at 150° C. It should be noted that the boron trifluoride pretreatment increased the adhesion value appreciably at every temperature tested.

Yet another group of coils were dipped in a solution of 25% solids, the solids being a polyisocyanate prepared by reacting 3 mols of 2,4-tolylene diisocyanate with 1 mol of trimethylolethane in methyl ethyl ketone. After curing for one hour at 150° C., 95 pounds of force was required to pull the straight portion of the wire from the coil at 125° C.

EXAMPLE V

| Modified Epoxy Component | Grams | Mols Diamine per Epoxy Equivalent |
|---|---|---|
| Aromatic Base Epoxy Resin | 600 | 0.59 |
| M-phenylenediamine | 12 | |

This component was prepared by following the procedure of Example I except that 12 grams of the diamine were used instead of the 18 grams employed in Example I. This component was employed in the blended adhesive coating composition as outlined.

Blended adhesive composition (solids basis):

|  | Percent by weight |
|---|---|
| Modified epoxy component | 75 |
| Polyvinyl formal component | 25 |

The modified epoxy component described was blended with a polyvinyl formal component identical to that described in Example III, in the proportions indicated. This blended adhesive coating composition was coated over the urea-formaldehyde modified epoxy resin undercoating, as in the previous examples. Good properties were obtained with enameling speeds in the range of 28 to 36 feet per minute. After fusing the adhesion test samples for one hour at 150° C., 35 pounds of force were required to remove the straight piece of wire from the helical coil at room temperature.

EXAMPLE VI

| Modified Epoxy Component | Grams | Mols Diamine per Epoxy Equivalent |
|---|---|---|
| Aromatic Base Epoxy Resin (Epoxy Equiv.= 3200) | 600 | 0.3 |
| M-phenylenediamine | 6 | |

A procedure identical to that described in Example I was followed except that 6 grams of the diamine were employed in place of the 18 grams employed in Example I.

Blended adhesive composition (solids basis):

|  | Percentage by weight |
|---|---|
| Modified epoxy component | 65 |
| Polyvinyl formal component | 35 |

The modified epoxy component described was blended with a polyvinyl formal component, identical to that described in Example III, in the proportions indicated. This blended adhesive coating composition was coated over the urea-formaldehyde modified epoxy undercoating as in the foregoing examples. After fusing adhesion test samples for one hour at 150° C., 74 pounds of force were required to remove the straight piece of wire from the helical coil at room temperature.

EXAMPLE VII

| Modified Epoxy Component | Grams | Mols Diamine per Epoxy Equivalent |
|---|---|---|
| Aromatic Base Epoxy Resin (Epoxy Equiv.= 3200) | 600 | 0.15 |
| M-phenylenediamine | 3 | |

The procedure employed in preparing this modified epoxy component was similar to that of Example I except that 3 grams of the diamine replaced the 18 grams of diamine employed in Example I. This component was employed in the blended adhesive coating composition as described below.

Blended adhesive coating composition (solids basis):

|  | Percentage by weight |
|---|---|
| Modified epoxy component | 55 |
| Polyvinyl formal component | 45 |

The polyvinyl formal component employed in this blend was identical to that described in Example III. The proportions of the components was as outlined above. This blended adhesive coating composition was coated over the urea-formaldehyde modified epoxy undercoat as in the foregoing examples. After fusing adhesion test samples for one hour at 150° C., 82 pounds of force were required to remove the straight piece of wire from the helical coil at room temperature. However, a significant decrease in coating flexibility was noted which would preclude the use of the coated wire in automatic winding machines and other rigorous applications. This composition also exhibited poor tank life.

EXAMPLE VIII

| Modified Epoxy Component | Grams | Mols Diamine per Epoxy Equivalent |
|---|---|---|
| Aromatic Base Epoxy Resin (Epoxy Equiv.= 950) | 600 | 0.26 |
| M-phenylenediamine | 18 | |

The preparation procedure employed herein was similar to that described in Example I except that a diglycidyl ether having an epoxy equivalent of approximately 950 was substituted for the epoxy resin employed heretofore.

Blended adhesive composition (solids basis):

|  | Percent by weight |
|---|---|
| Modified epoxy component | 55 |
| Polyvinyl formal composition | 45 |

The polyvinyl formal composition employed was identical to that described in Example III. This composition, in conjunction with the urea-formaldehyde modified epoxy undercoating, was employed in a two-coat system to coat No. 17 AWG wire, as in the foregoing examples. After fusing adhesion test samples for one hour at 150° C., 36 pounds of force were required to remove the straight piece of wire from the helical coil at room temperature. Satisfactory flexibility and tank life was exhibited.

EXAMPLE IX

Blended adhesive composition
(solids basis): Percent by weight
    Modified epoxy component _____ 56.5
    Polyvinyl formal component _____ 25.0
    Aliphatic base diglycidyl ether
      (epoxy equiv.=195) _____ 18.5

In the adhesive coating composition of this example, an aliphatic base glycidyl ether polymer was blended in with the components described in Example III, in the proportions outlined hereinabove. The ratio of mols of diamine per epoxy equivalent (only the aromatic base epoxy is included) was 0.89. Employing this adhesive coating composition in conjunction with the urea-formaldehyde epoxy modified undercoating, good properties were obtained on 17 AWG wire. After fusing adhesion test samples for one hour at 125° C., 54 pounds of force were required to remove the straight piece of wire from the helical coil at room temperature. At 100° C., 41 pounds of force were required to remove the straight piece of wire from the helical coil. This adhesive coating composition exhibited an unusually high retention of adhesion or bond strength at 100° C.

EXAMPLE X

Modified epoxy component: Grams
    Aromatic base epoxy resin
      (epoxy equiv.=1800) _____ 600
    M-phenylenediamine _____ 18

This component was prepared by following the procedure outlined in Example I except that a diglycidyl ether having an epoxy equivalent of approximately 1800 was substituted for the diglycidyl ether employed therein. The ratio of mols of diamine per epoxy equivalent (only the aromatic base epoxy is included) was 0.5. This product was employed as a component in the blended adhesive coating composition described below.

Blended adhesive composition
(solids basis): Percent by weight
    Modified epoxy component _____ 34
    Polyvinyl formal component _____ 15
    Aliphatic base diglycidyl ether
      (epoxy equiv.=195) _____ 11
    Phenol-modified coumarone-indene resin ____ 40

In conjunction with the urea-formaldehyde modified epoxy undercoating, this adhesive overcoating composition was coated on No. 17 AWG wire. After fusing adhesion test samples for one hour at 125° C., 55 pounds of force were required to remove the straight piece of wire from the helical coil at room temperature.

EXAMPLE XI

Blended adhesive composition
(solids basis): Percent by weight
    Modified epoxy component _____ 38.2
    Polyvinyl formal component _____ 17.2
    Phenol-modified coumarone-indene _____ 44.6

Both the modified epoxy component and the polyvinyl formal component, employed herein, are identical to those described in Example X. The ratio of mols of diamine per epoxy equivalent was 0.5. It should be noted that the aliphatic base epoxy was not employed in this blend. Employing this adhesive coating composition in conjunction with the urea-formaldehyde modified epoxy undercoating, a combination coating was deposited on 17 AWG wire, as in the prior examples. After fusing adhesion test samples for one hour at 125° C., 43 pounds of force were required to remove the straight piece of wire from the helical coil at room temperature.

EXAMPLE XII

| Modified Epoxy Component | Grams | Mols Diamine per Epoxy Equivalent |
|---|---|---|
| Aromatic Base Epoxy Resin (Epoxy Equiv.= 1800) | 600 | 0.90 |
| Methylene dianiline | 60 | |

The procedure employed in preparing this modified epoxy component was similar to that of Example I. As detailed hereinbelow, this product was one component of a blended adhesive composition.

Blended adhesive composition
(solids basis): Percent by weight
    Modified epoxy component _____ 45
    Polyvinyl formal component _____ 55

This blended adhesive coating composition, employing a polyvinyl formal identical to that described in Example III, was coated over the urea-formaldehyde modified epoxy undercoating as in the foregoing examples. Wire and adhesion properties were similar to results on the samples of Example IV.

EXAMPLE XIII

Modified epoxy component: Grams
    Aromatic base epoxy resin
      (epoxy equiv.=1800) _____ 250
    M-phenylenediamine _____ 7.5
    Monoethanolamine _____ 4.2

The epoxy resin was dissolved in 375 grams of Cellosolve acetate in a 3-neck flask containing a stirrer, thermometer, nitrogen gas inlet tube and reflux condenser. The diamine and monoethanolamine were added and the charge was refluxed for 4 hours at 140° C. with nitrogen sparging. The product was diluted with 28 grams of Cellosolve acetate.

Blended adhesive composition
(solids basis): Percent by weight
    Modified epoxy component _____ 45
    Polyvinyl formal component _____ 55

The polyvinyl formal component is identical to that described in Example III. In this example, distinguished from all of the foregoing examples, no undercoating was employed and only the blended adhesive coating composition was applied to 17 AWG wire to a build of 3.0 mils. After fusing adhesion test samples for one hour at 125° C., 64 to 80 pounds of force were required to remove the straight piece of wire from the helical coil at room temperature. It should be noted that the modified epoxy component of this example employed 0.5 mol of phenylenediamine and 0.5 mol of monoethanolamine per epoxy equivalent.

Referring now particularly to FIG. 1, there is illustrated an insulated adhesive coated wire conductor 10. The copper wire 11 is insulated with an adherent solidified undercoating of urea-formaldehyde modified epoxy or other insulating resin 12. Applied thereover is the adhesive overcoat 13 of this invention.

Figure 2:
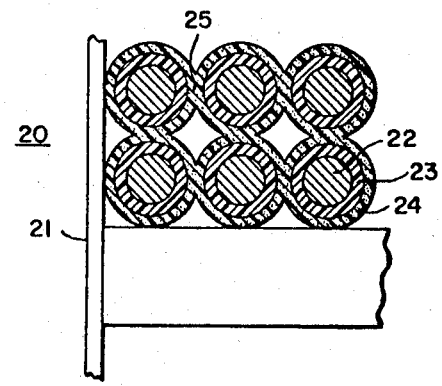
FIG. 2 is a partial cross-section of a coil bound together in a unitary mass according to this invention.

In the embodiment exemplified by FIG. 2, there is illustrated a plurality of insulated adhesive coated wire conductors, each conductor 22 having an insulating undercoating 23 and an adhesive overcoating 24. From the application of heat and/or solvent, the adhesive coating of adjacent turns of the coil on the coil form or bobbin 21 has fused together at 25 to firmly bond the conductors into a unitary, rigid vibration-proof coil 20. The individual conductors have been sealed together into a unitary body without resorting to varnish impregnation.

Figure 3:
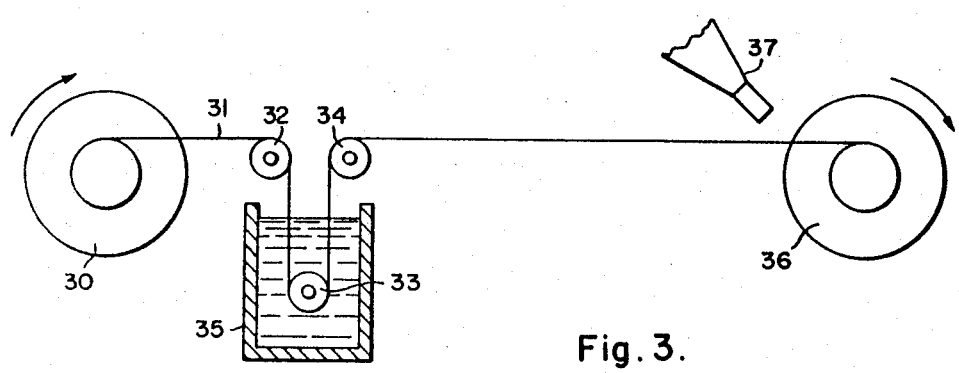
FIG. 3 is a schematic layout illustrating a method of winding coils according to this invention.

A process for preparing the rigid, unitary coils according to this invention is schematically illustrated in FIG. 3. The adhesive-coated wire 31 is fed from the payoff reel 30 to the dip tank 35 containing a solution of a complexed boron trifluoride or other cross-linking agent.

The rollers 32, 33, 34 ensure a uniform feed and immersion of the wire into the solution in the dip tank. The treated adhesive coated wire may be wound into a coil on the winder 36 while a hot air blast 37 is directed at the coil to fuse and/or cure the adhesive coating.

It should be understood that other methods may be employed to fabricate the unitary rigid coils from the adhesive coated wire. For example, the adhesive coated wire may be dipped into the solution containing a complex boron trifluoride catalyst, the thus treated wire being wound into coils. The wound coils may then be heated in an oven employing proper times and temperatures to cure the coating to an infusible state and cement the individual conductors into a unitary rigid structure. Alternatively, the adhesive coated conductors may be first wound into coil form, the coil may be dipped into a solution of the cross-linking agent and the coil may then be heated to cure it into a thermoset unitary mass. Although the coil illustrated in FIG. 2 shows that the coating alone is relied on as layer insulation, it is to be understood that other types of coils may be fabricated from the adhesive coated wire. U.S. application Ser. No. 141,738, filed Sept. 29, 1961 and assigned to the assignee of this invention was abandoned and refiled as continuing application Ser. No. 414,503, which was issued as U.S. Patent 3,237,136 on Feb. 22, 1966. That patent discloses another suitable coil wherein the adhesive compositions, coated conductors and methods of this invention may be employed. It is to be understood, for example, that the adhesive coating will bond to sheet material, as for example paper, which may be interposed between layers in a coil as insulation. A unitary, rigid coil may be thus produced even though there is no contact between adjacent layers of adhesive coated wire.

While there have been shown and described what are at present considered to be the preferred embodiments of the invention, modifications thereto will readily occur to those skilled in the art. It is not desired, therefore, that the invention be limited to the specific arrangements and methods shown and described and it is intended to cover in the appended claims all such modifications as fall within the true spirit and scope of the invention.

I claim as my invention:

1. An insulated bondable electrical conductor comprising, in combination, a solidified adherent insulating resinous first coating deposited about the conductor, a fusible flexible adhesive coating deposited over the first coating, the adhesive coating consisting essentially of the heteropolymeric reaction product of (1) a diglycidyl ether of a polyhydric phenol having an epoxy equivalent from about 950 to 3200 with (2) from about 0.25 to 1.0 mols of a chain growth promotion material per epoxy equivalent comprising (a) at least 50%, or a molar basis, of an aromatic diamine and (b) up to 50%, on a molar basis, of an alkyl amino alcohol.

2. The insulated bondable electrical conductor of claim 1 wherein said adhesive coating contains (A) up to 55%, by weight, of a polyvinyl acetal resin, (B) up to 19%, by weight, of aliphatic base diglycidyl ether resin and (C) up to 45%, by weight, of a phenol-modified coumarone-indene resin.

3. The insulated bondable electrical conductor of claim 1 wherein the adhesive coating contains up to 55%, by weight, of a polyvinyl acetal resin.

4. The insulated bondable electrical conductor of claim 1 wherein the adhesive coating contains from about 15 to 55%, by weight, of a polyvinyl acetal resin.

5. The insulated bondable electrical conductor of claim 1 wherein the adhesive coating is the heat reaction product of a blend consisting essentially of (A) at least 81%, by weight, of a heteropolymeric reaction product of (1) a diglycidyl ether of a polyhydric phenol having an epoxy equivalent from about 950 to about 3200 with (2) from about 0.25 to 1.0 mols of a chain growth promoting material per epoxy equivalent comprising (a) at least 50%, on a molar basis, of an aromatic diamine and (b) up to 50%, on a molar basis, of an alkyl amino alcohol, the balance being (B) up to 19%, by weight, of an aliphatic base diglycidyl ether.

6. The insulated bondable electrical conductor of claim 1 wherein the adhesive coating is the heat reaction product of a blend consisting essentially of (A) at least 55%, by weight, of a heteropolymeric reaction product of (1) a diglycidyl ether of a polyhydric phenol having an epoxy equivalent from about 950 to about 3200 with (2) from about 0.25 to 1.0 mols of a chain growth promoting material per epoxy equivalent comprising (a) at least 50%, on a molar basis, of an aromatic diamine and (b) up to 50%, on a molar basis, of an alkyl amino alcohol, the balance being (B) up to 45%, by weight, of a phenol-modified coumarone-indene resin.

7. An electrical coil comprising plural turns of the insulated electrical conductor of claim 1 wherein the adhesive coating is fused and forms a resinous bond between turns of conductor.

8. An electrical coil comprising plural turns of the insulated electrical conductor of claim 2.

9. An electrical coil comprising plural turns of the insulated electrical conductor of claim 3 wherein the adhesive coating is fused and forms a resinous bond between turns of the conductor.

10. An electrical coil comprising plural turns of the insulated electrical conductor of claim 5 wherein the adhesive coating is fused and forms a resinous bond between turns on the conductor.

11. An electrical coil comprising plural turns of the insulated electrical conductor of claim 6 wherein the adhesive coating is fused and forms a resinous bond between turns of the conductor.

12. The electrical coil of claim 7 wherein the bond between the turns of the conductor, is an infusible cross-linked reaction product of the adhesive coating and (A) a cross-linking agent selected from the group consisting of boron trifluoride complexes, polyisocyanates having the general formula:

$$R-(N=C=O)_n$$

wherein R is a polyvalent organic radical and $n$ is an integer of 3 or more and blocked isocyanates having the general formula:

$$R-\left(\underset{N}{\overset{H}{\|}}-\underset{C}{\overset{O}{\|}}-OR_1\right)_n$$

wherein R is a polyvalent organic radical, $R_1$ is a phenyl group or a derivate thereof containing methyl substituents and $n$ is an integer of 3 or more.

13. The electrical coil of claim 12 in which the cross-linking agent is a boron trifluoride complex.

14. The electrical coil of claim 12 in which the cross-linking agent is a polyisocyanate having the general formula:

$$R-(N=C=O)_n$$

wherein R is a polyvalent organic radical and $n$ is an integer of 3 or more.

15. The electrical coil of claim 12 in which the cross-linking agent is a blocked isocyanate having the general formula:

$$R-\left(\underset{N}{\overset{H}{\|}}-\underset{C}{\overset{O}{\|}}-OR_1\right)_n$$

wherein R is a polyvalent organic radical, $R_1$ is a phenyl group or a derivate thereof containing methyl substituents and $n$ is an integer of 3 or more.

16. A method of producing an electrical coil of plural turns of an insulated electrical conductor bonded together into a rigid unitary body, comprising the steps of depositing a solidified adherent resinous insulating first coating about the conductor, depositing a fusible flexible adhesive coating about the first coating, the adhesive coating being the heat reaction product of a blend of (A) at least 45%, by weight, of a heteropolymeric reaction product of an aromatic base diglycidyl ether having an epoxide equivalent from about 950 to about 3200 with (2) from about 0.25 to 1.0 mols of a chain growth promoting material per epoxy equivalent comprising (a) at least 50%, on a molar basis, of an aromatic diamine and (b) up to 50%, on a molar basis, of an alkyl amine alcohol, the balance of the blend being (B) up to 55%, by weight, of a polyvinyl acetal resin, (C) up to 19%, by weight, of an aliphatic base diglycidyl ether and (D) up to 45%, by weight, of a phenol-modified coumarone-indene resin, contacting the adhesive coating with a cross-linking agent, winding the conductor into coil form and heating the coil to a temperature of at least 125° C. to fuse the adhesive coating and cure it to a thermoset state.

17. The method of claim 16 wherein, prior to heating, the coated conductor is contacted with a solution containing a cross-linking agent selected from the group consisting of a complexed boron trifluoride, a polyisocyanate having the formula:

$$R-(N=C=O)_n$$

wherein R is a polyvalent organic radical and $n$ is an integer of 3 or more, may be employed, and a blocked polyisocyanate having the formula:

wherein R is a polyvalent organic radical, $n$ is an integer of 3 or more and $R_1$ is a phenyl group or a derivate thereof containing methyl substituents.

18. The method of claim 17 wherein the solution contains a complexed boron trifluoride.

19. The method of claim 17 wherein the solution contains a polyisocyanate having the formula:

$$R-(N=C=O)_n$$

wherein R is a polyvalent organic radical and $n$ is an integer of 3.

20. The method of claim 17 wherein the solution contains a blocked polyisocyanate having the formula:

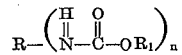

wherein R is a polyvalent organic radical, $n$ is an integer of 3 or more and $R_1$ is a phenyl group or a derivate thereof containing methyl substituents.

References Cited

UNITED STATES PATENTS

| | | | |
|---|---|---|---|
| 3,100,756 | 8/1963 | Fry | 260—830 |
| 3,239,598 | 3/1966 | Olson | 174—120 |

OTHER REFERENCES

Condensed Chemical Dictionary, Reinhold, New York, sixth edition, 1961, p. 445.

LEWIS H. MYERS, *Primary Examiner.*

ELLIOTT GOLDBERG, DARRELL L. CLAY,
*Examiners.*